United States Patent [19]

Tomita et al.

[11] Patent Number: 5,177,354

[45] Date of Patent: Jan. 5, 1993

[54] DEVICE AND A METHOD FOR DISTINGUISHING FAULTS EMPLOYED IN AN OPTICAL TRANSMISSION SYSTEM

[75] Inventors: Nobuo Tomita, Ibaraki; Takashi Nakamura, Shiga; Hidetoshi Takasugi, Saitama; Hideki Suzuki, Kanagawa, all of Japan

[73] Assignee: Nippon Telegraph and Telephone Corporation, Tokyo, Japan

[21] Appl. No.: 624,444

[22] Filed: Dec. 10, 1990

[30] Foreign Application Priority Data

Dec. 11, 1989 [JP] Japan .................. 1-320946
Sep. 3, 1990 [JP] Japan .................. 2-232734

[51] Int. Cl.⁵ ............................................. H01J 5/16
[52] U.S. Cl. ........................ 250/227.15; 250/227.23; 356/73.1
[58] Field of Search ............. 356/73.1; 250/227.15, 250/227.18, 227.21, 227.23, 227.24, 227.25; 385/47, 48

[56] References Cited

U.S. PATENT DOCUMENTS

| | | | |
|---|---|---|---|
| 3,981,592 | 9/1976 | Williams | 250/227.15 |
| 4,373,775 | 2/1983 | Gasparian | 385/47 |
| 4,637,682 | 1/1987 | Mahlein et al. | 385/47 |
| 4,749,247 | 6/1988 | Large | 356/73.1 |
| 4,774,407 | 9/1988 | Erbe | 250/227.23 |
| 4,813,756 | 3/1989 | Frenkel et al. | 350/96.18 |
| 4,848,999 | 7/1989 | Taylor | 385/48 |
| 4,899,043 | 2/1990 | Mochizuki et al. | 356/73.1 |
| 4,899,045 | 2/1990 | Kramer | 250/227.23 |
| 5,001,338 | 3/1991 | Boero | 250/227.23 |

FOREIGN PATENT DOCUMENTS 0037057 10/1981 European Pat. Off. .
59-196438 11/1984 Japan .

OTHER PUBLICATIONS

The Bell System Technical Journal, vol. 56, No. 5, May-Jun. 1977 "Loss Analysis of Single-Mode Fiber Splices", D. Marcuse, pp. 703-718.

Primary Examiner—David C. Nelms
Assistant Examiner—John R. Lee
Attorney, Agent, or Firm—Finnegan, Henderson, Farabow, Garrett and Dunner

[57] ABSTRACT

The present invention discloses a fault distinguishing device for establishing whether fault exists in an optical fiber cable and in another optical system. The disclosed device is intermediate between the optical fiber cable and the another optical system and optically coupled with the optical fiber cable and the another optical system. The disclosed device is composed of at least one intrinsic optical fiber and at least one optical filter. The optical filter is internal to a corresponding intrinsic optical fiber, and forms an angle of between 0 and 4.7 degrees inclusive with respect to a plane perpendicular to the longitudinal axis of the intrinsic optical fiber, such that the optical fiber is cable of reflecting a first light component and of transmitting a second light component. The first light component and the second light component differ from one another in terms of wavelength.

12 Claims, 15 Drawing Sheets

| WAVELLENGTH (μm) | THE VOLUME OF REFLECTION ATTENUATION (dB) | | TRANSMISSION LOSSES (dB) | |
|---|---|---|---|---|
| | DESIRED VALUE | MEASURED VALUE (n=6) | DESIRED VALUE | MEASURED VALUE (n=6) |
| 1.31 | >22 | $\bar{x}$=26.5, min=24.9 | <0.6 | $\bar{x}$=0.45, max=0.49 |
| 1.55 | <10 | $\bar{x}$=8.75, max=9.92 | >54 | $\bar{x}$=56.2, min=55.2 |

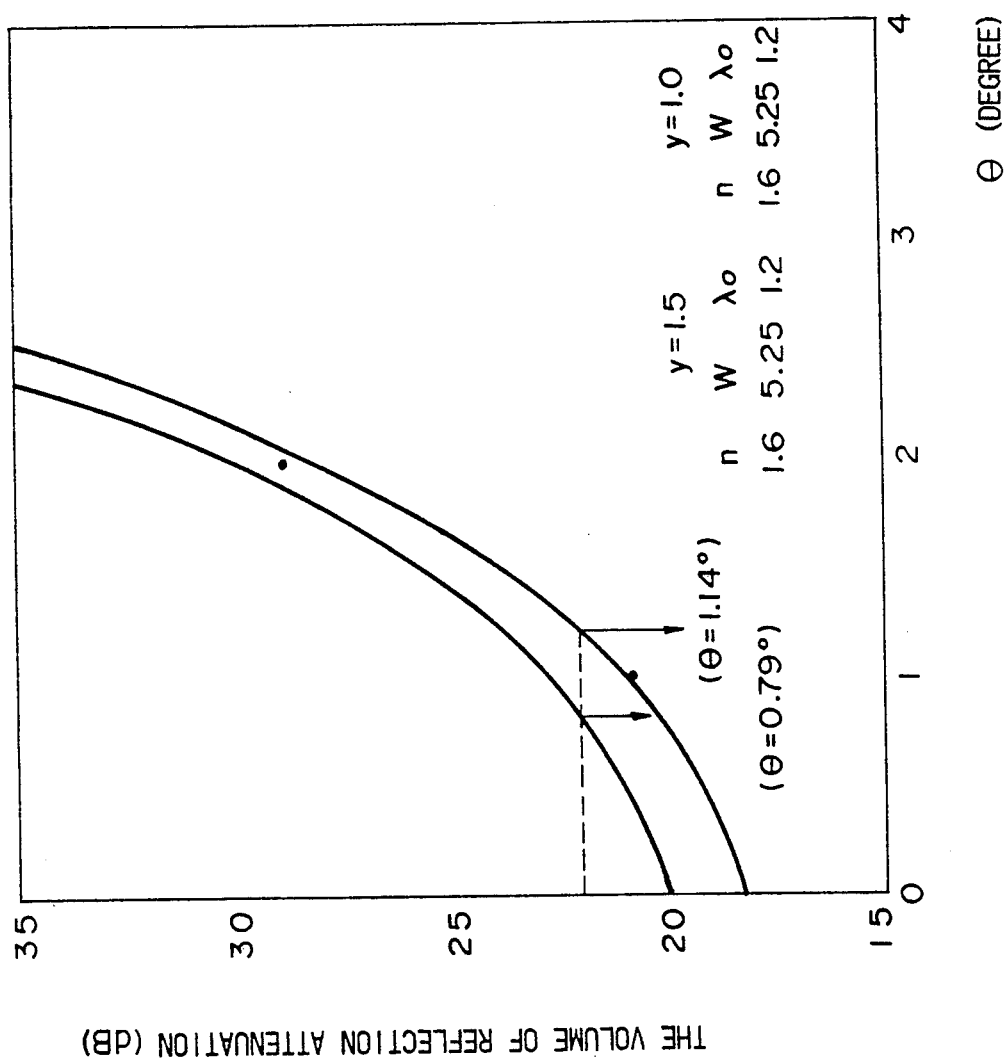

DEVICE AND A METHOD FOR DISTINGUISHING FAULTS EMPLOYED IN AN OPTICAL TRANSMISSION SYSTEM

BACKGROUND OF THE INVENTION

1. Field of the Invention

The present invention relates to a device and a method for distinguishing clearly, separately and automatically by a remote control without interrupting service, faults, whether the faults exist in an optical fiber cable or in another optical apparatus, such as an optical receiver employed in an optical transmission system.

2. Prior Art

Until now, the method for detecting whether a fault occurred on the optical fiber cable or on the optical receiver in the optical transmission system, that is, the method for distinguishing a fault between the optical fiber cable and the optical receiver is provided in Japanese Patent Application No. 58-71089.

FIG. 1 is a block diagram showing the optical transmission system and the fault distinguishing device used for carrying out the above mentioned conventional method. As shown in FIG. 1, the optical transmission system comprises an optical transmitter 1 for transmitting optical signals, an optical fiber cable 2 used as transmission lines and an optical receiver 3 for receiving optical signals. An optical filter 4a is located adjacent to the optical transmitter 1 in the optical fiber cable 2. On the other hand, an optical filter 4b, which has the same construction as the optical filter 4a, is located adjacent to the optical receiver 3 in the optical fiber cable 2. As illustrated in detail in FIG. 2, the optical filter 4b is constructed such that it passes a test light $\lambda_t$ for detecting the fault positions on the transmission lines but blocks and reflects a communication light $\lambda_c$ of the data transmission. Reflector 5 is disposed right behind the optical filter 4b and reflects almost perfectly test light $\lambda_t$ incident thereon through the optical filter 4b. A reference numeral 6 denotes a light pulse testing apparatus. This light pulse testing apparatus 6 is composed of a light source 7 emitting test pulse light $\lambda_t$, an optical multiplexer/demultiplexer 8 for joining and branching lights and a light pulse receiver 9 receiving test light $\lambda_t$ reflected by the reflector 5 and transmitted back through the optical fiber cable 2.

According to the above mentioned conventional method, in the time of detecting a fault position, if a fault, such as a break of the optical fiber and the like happens on the optical fiber cable 2, it can be confirmed that the cause of the fault exists on the optical fiber cable 2, since the reflected test light $\lambda_t$ is not received by the light pulse receiver 9.

On the other hand, when the reflected test light $\lambda_t$ is received by the light pulse receiver 9, it can be confirmed that the cause of the fault exists in the optical receiver 3, and not in the optical fiber cable 2.

However, with the above described conventional method, the respective connections of the optical filter 4b with the optical fiber cable 2, with the optical receiver 3, and that with the reflector 5 are such that insertion losses are 3 dB or greater, owing to the constructions of the lens optical systems. Similarly, as the optical filter 4a and the light pulse testing apparatus 6 is connected with the lens optical system, the insertion losses therein are 3 dB or greater.

Thus, miniaturization as well as reduction of manufacturing costs for transmission system has been difficult to achieve.

In addition, the devices manufactured by such conventional method have generally demonstrated significant optical losses.

Also, with the above described conventional method, although it can detect that the cause of a fault is in the optical fiber cable, it cannot detect the position of the fault.

Further, the above conventional method is unsuitable for applying to a branching optical transmission paths available for picture distribution service.

SUMMARY OF THE INVENTION

In view of the above, it is an object of the present invention to provide a device and a method for distinguishing easily in virtue of miniaturization and exactly in virtue of decreased optical losses, a fault between an optical fiber cable and a optical receiver.

In a first aspect of the present invention, there is provided a fault distinguishing device for establishing whether fault exists in an optical fiber cable and in another optical system, where the fault distinguishing device is intermediate between the optical fiber cable and the another optical system and optically coupled with the optical fiber cable and the other optical system, such that the fault distinguishing device is characterized by including:

at least one intrinsic optical fiber; and at least one optical filter, where the optical filter is internal to a corresponding intrinsic optical fiber, and forms an angle of between 0 and 4.7 degrees inclusive with respect to a plane perpendicular to the longitudinal axis of the intrinsic optical fiber, such that the optical filter is capable of reflecting a first light component and of transmitting a second light component, where the first light component and the second light component differ from one another in terms of wavelength.

In a second aspect of the present invention, there is provided a fault distinguishing method for establishing whether fault exists in an optical fiber cable and in another optical system, the method comprising the steps of:

introducing a test pulse light for detecting a fault position into the optical fiber cable via an optical coupler, whereby the test pulse light is used for detecting a fault position and is different from a communication light for transmitting data; receiving the test pulse light reflected by an optical filter disposed right in front of the another optical system, and whereby detecting an intensity of the reflected test pulse light and a reflecting position, wherein the optical filter reflects only the test pulse light; comparing the detected intensity and reflecting position with a beforehand measured intensity and reflecting position about the test pulse light reflected by the optical filter at normal state in the optical transmission system; judging that a fault exists in the optical fiber cable and determining a position of the fault, as a result of the comparison, when variation occurs in at least one of the intensity and reflecting position; and judging that a fault does not exist in the optical fiber cable, as a result of the comparison, when variation does not occur in both the intensity and reflecting position.

In a third aspect of the present invention, there is provided a method for distinguishing a fault among an optical fiber cable, branching optical fibers and optical receivers employed in an optical transmission system, the method comprising the steps of: introducing respectively test pulse lights for detecting a fault position into the branching optical fiber cables via an optical divider, whereby the test pulse lights are used for detecting fault positions and different from a communication light for transmitting data; receiving the test pulse lights reflected by respective optical filters disposed right in front of the optical receivers, and whereby detecting intensities of the reflected test pulse lights and reflecting positions, wherein the optical filters reflect only the test pulse lights; comparing the detected intensities and reflecting positions with beforehand measured intensities and reflecting positions about the test pulse lights reflected respectively by the optical filters at a normal state in the optical transmission system; judging that a fault exists in the optical fiber cable and determining a position of the fault, as a result of the comparison, when variation occurs in at least one of the intensities and reflecting positions; and judging that a fault does not exist in the optical fiber cable, as a result of the comparison, when variation does not occurs in neither of the intensities and reflecting positions.

BRIEF DESCRIPTION OF THE DRAWINGS

FIGS. 16 to 20 are graphs showing respectively the relationship between the volume of reflection attenuation and the filter angle $\theta$, based on a calculated result.

DETAILED DESCRIPTION OF THE PREFERRED EMBODIMENTS

[A] First Preferred Embodiment

In the following section, the first preferred embodiment of the present invention will be described with reference to FIGS. 3 to 9.

(1) Construction

Figure 3:
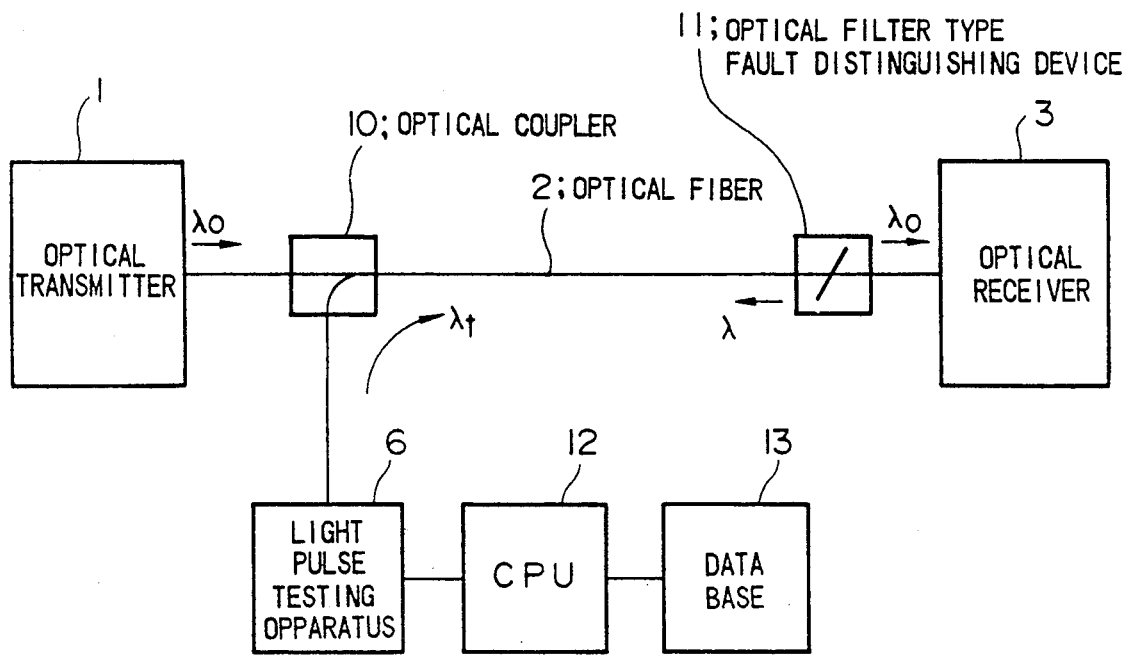
FIG. 3 is a block diagram showing an optical transmission system employing a fault distinguishing device and the method according to a first preferred embodiment of the present invention.

FIG. 3 is a block diagram showing the optical transmission system employing the fault distinguishing device and the method according to the first preferred embodiment of the present invention.

Figure 1:
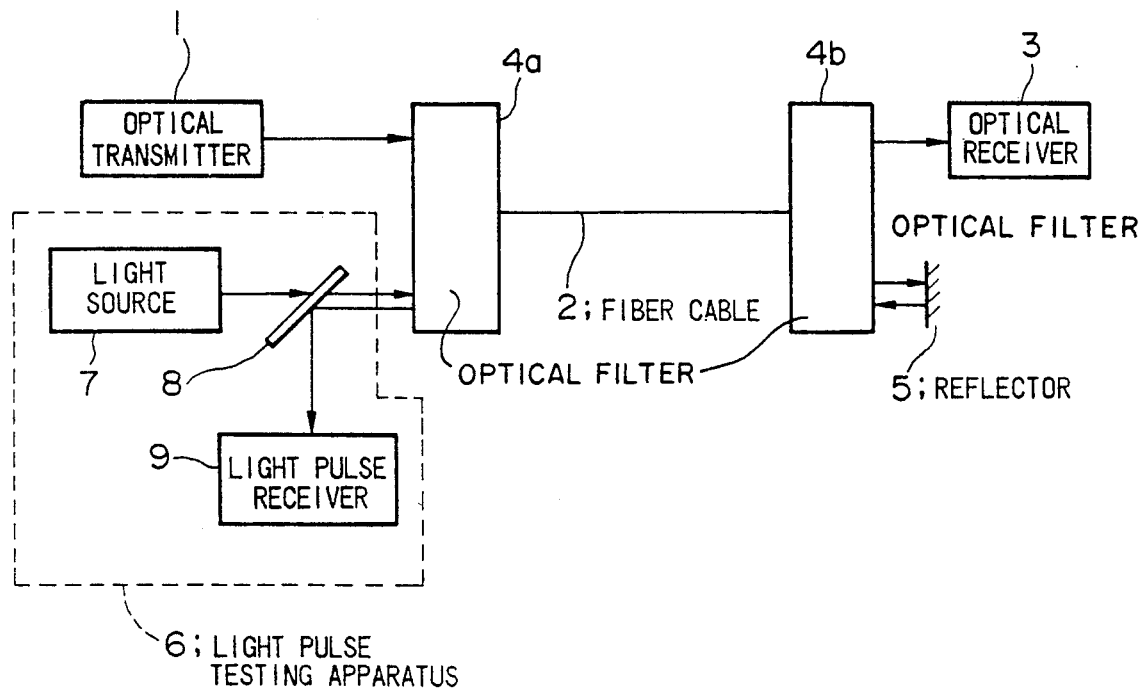
FIG. 1 is a block diagram showing an optical transmission system and a fault distinguishing device used for carrying out a conventional method for distinguishing a fault between an optical fiber cable and an optical receiver employed in an optical transmission system.
Figure 2:
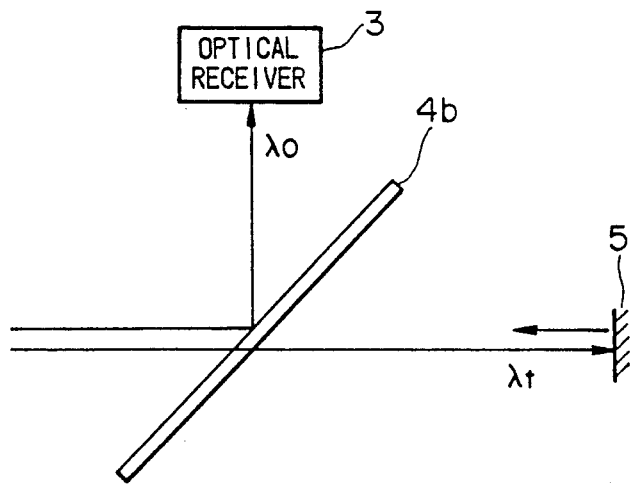
FIG. 2 is a detailed diagram illustrating a conventional optical filter provided in the fault distinguishing device.

In this figure, the components identical to the components of the system of the prior art shown in FIG. 2 will be indicated with reference numerals identical to the latter and description thereof will be omitted.

Figure 4:
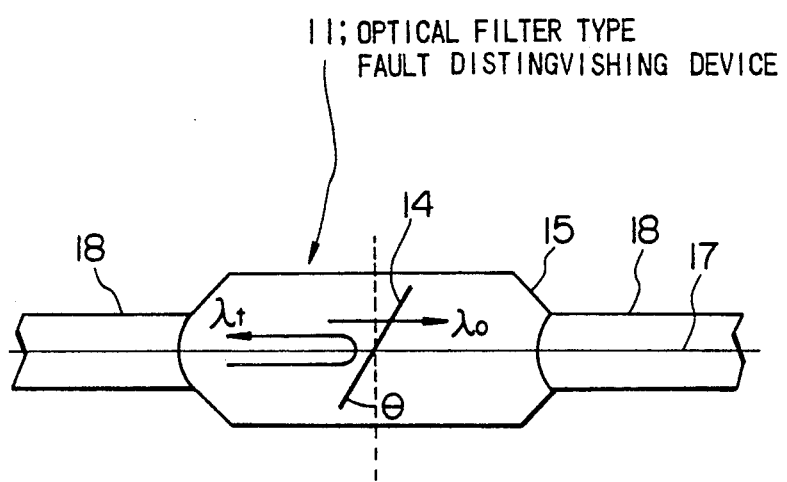
FIG. 4 is a detailed diagram illustrating an optical filter type fault distinguishing device according to the first preferred embodiment of the present invention.

In FIG. 3, reference numeral 10 denotes an optical coupler, 11 denotes an optical filter type fault distinguishing device (hereinafter referred to as filter type distinguishing device), 12 denotes a CPU (central processing unit) for controlling a light pulse testing apparatus 6, and 13 denotes a data base for storing various kinds of data. As illustrated in FIG. 4, the above mentioned filter type distinguishing device 11 is composed of a communication light transmitting/test light blocking type optical filter 14, a reinforcement 15 for reinforcing the optical filter 14, and cords 18 containing the optical fiber 17 at the center of its longitudinal axis. The above optical filter 14 has the construction similar to various types of optical interference filters and bandpass optical filters. That is to say, the optical filter 14 is constituted of multiple layers containing a titanium oxide layer, silicon oxide layer and the like, such that it transmits the communication light $\lambda_o$ but reflects and blocks the test light $\lambda_t$, of which the wavelength is different from the wavelength of the communication light $\lambda_o$, utilizing the mutual interference with multi-reflected lights by each multiple layers. When the optical filter 14 is set so as to lie in a plane which forms a suitable angle $\theta$ (hereinafter referred to as filter angle $\theta$) with the plane perpendicular to the longitudinal axis of the optical fiber 17, as shown in FIG. 4, the test light $\lambda_t$ blocked by the optical filter 14 is input again to the optical fiber cable 2 and passes back therein with little scattering. Therefore, as described above, if the setting of the filter angle $\theta$ is suitable, the volume of the reflection attenuation of the test light $\lambda_t$ may be increased.

Next, the method for determining the filter angle $\theta$ will be described in detail.

This filter angle $\theta$ must be determined in view of the volumes of reflection attenuation of both the test light $\lambda_t$ and the communication light $\lambda_i$.

(i) the Volume of the Reflection Attenuation of Test Light:

In the filter type distinguishing device 11 shown in FIG. 4, when the test light $\lambda_t$ is almost perfectly back-reflected by the optical filter 14 and incident again on the optical fiber 17, the reflected light would be attenuated corresponding to a connecting losses of the optical fiber 17 shifted to the angle of $2\theta$. Accordingly, the volume Lrt of the reflection attenuation of the test light is the result of adding an insertion losses it to the above connecting losses.

An equation for calculating the connecting losses resulting from the above angle shift has been derived by Marcuse (B.S.T.J. 56.5.1977). Therefore, the volume Lrt of the reflection attenuation can be expressed as shown in the following Equ. 1:

$$Lrt = -10 \log (\exp(-(2\pi n w \theta)^2/\lambda^2)) - It$$

Herein, n denotes a refractive index of the cladding constituting an optical fiber; W denotes a spot size in an optical fiber; and $\lambda$ denotes the wavelength of a test light.

Figure 5:
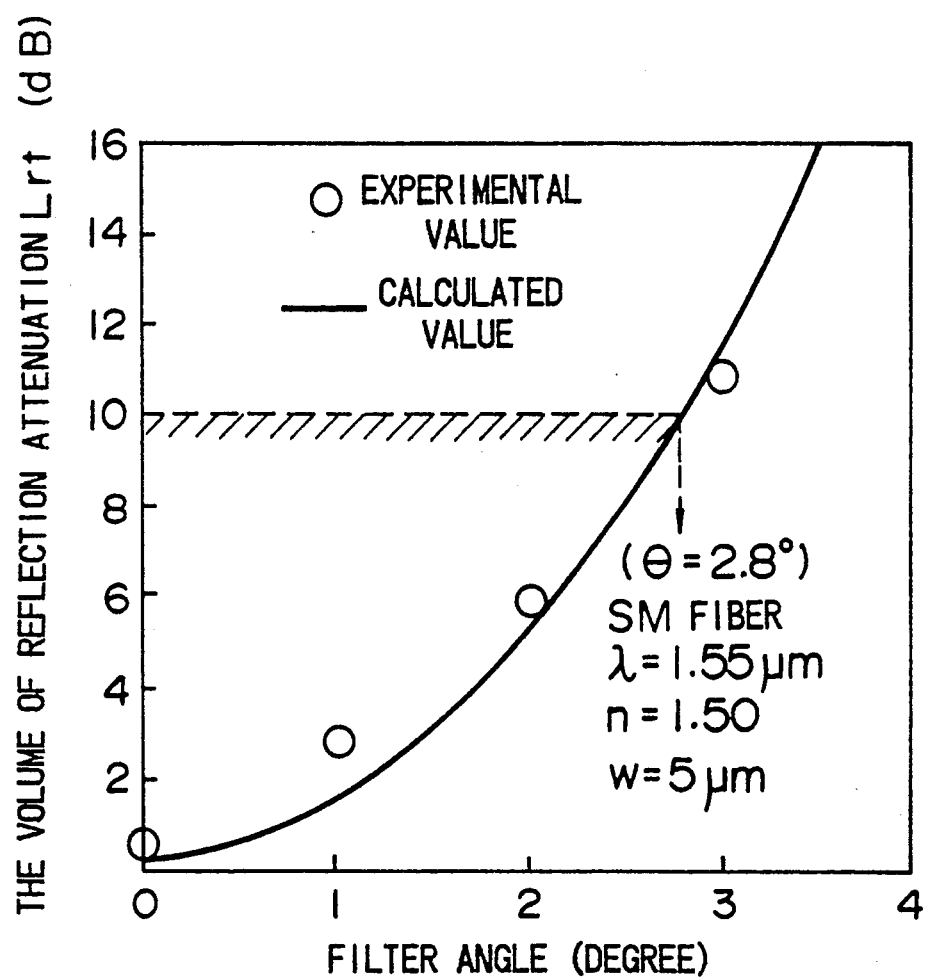
FIG. 5 is a graph illustrating the relationship between volume of reflection attenuation and filter angle $\theta$, based on a calculation result and an experimental result.

FIG. 5 is a graph illustrating the relationship between volume of reflection attenuation as a function of filter angle $\theta$, based on the calculation result obtained using Equ. 1, and an experimental result.

As shown clearly in the same figure, the calculation result agrees the experiment result. Accordingly, in this way the volume of the reflection attenuation can be evaluated from the calculation result of Equ. 1.

The minimum volume 14.3 dB of the Fresnel reflection attenuation results from the optical fiber core being broken adjacent to the filter type distinguishing device 11. In view of the above minimum volume 14.3 dB and the margin of the loss variation in the system, a fault should be clearly and separately distinguished even at the volume 10 dB of the reflection attenuation as shown with the broken line in the same figure. Thus, desired filter angle $\theta$ must be 2.8 degrees or less.

(ii) the Volume of the Reflection Attenuation of Communication Light:

The reflection of the communication light $\lambda_o$ occurs as a result of from ripple of the transmission range of wavelength. The weak communication light $\lambda_o$ reflected and blocked by the optical filter 14, resulting from the above ripple, is transmitted back through the optical fiber cable 2 similar to the test light $\lambda_t$.

Therefore, the volume Lrs of the reflection attenuation of the communication light $\lambda_o$ can be expressed as shown in the following Equ. 2, based on the above mentioned y % and Equ. 1:

$$Lrs = -10 \log (y \cdot 100) - Lri$$

Herein, $\lambda$ in Lrt shown in Equ. 1 denotes the wavelength of a communication light.

Figures 6, 7:
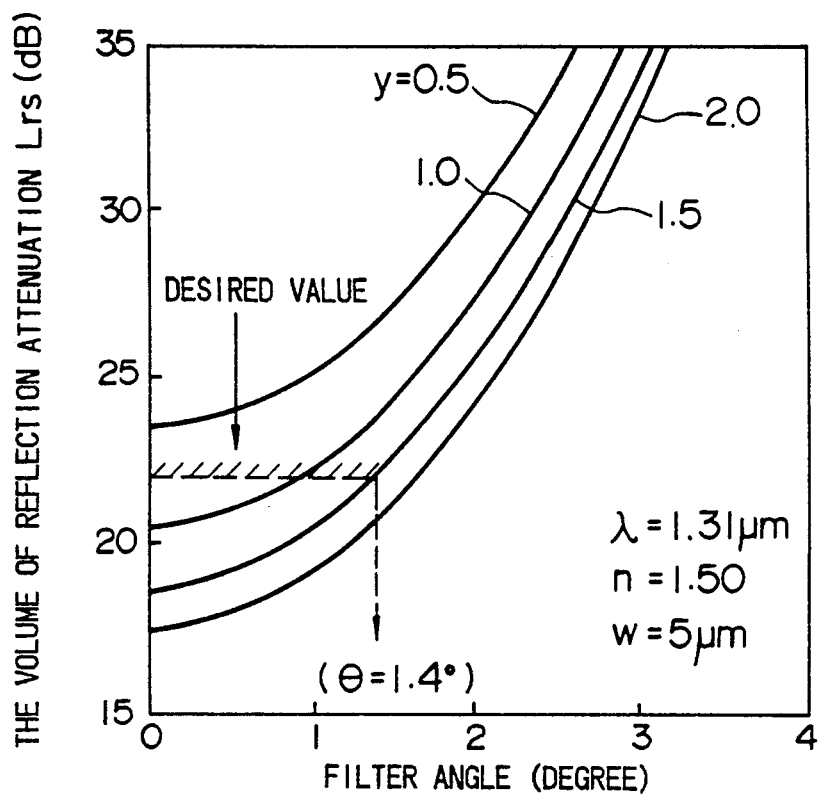
FIG. 6 is a graph illustrating the relationship between volume of reflection attenuation and filter angle $\theta$ resulting from ripples.
FIG. 7 is a table showing the comparisons of desired values of the optical properties with measured values of the filter distinguishing device according to the first preferred embodiment of the present invention.

FIG. 6 is a graph illustrating the relationship between volume of reflection attenuation and filter angle $\theta$ resulting from the above ripples.

The volume Lrs of the reflection attenuation as shown with the broken line in the same figure, represents a standard value of the connector for the communication light.

In view of the above standard value of the connector, desired filter angle $\theta$ must be 1.4 degrees or greater in case the ripple y is fixed on the order of about 1.5%.

According to FIGS. 5 and 6, the filter angle $\theta$ must be set within the range of from 1.4 to 2.8 degrees.

FIG. 7 is a table showing the respective comparisons of the desired volume with the measured volume of the reflection attenuation, and desired transmission losses with the measured transmission losses in the trial filter type distinguishing device 11 according to this embodiment.

In this trial product, the filter angle $\theta$ has been set to 2.0 degrees. As shown clearly in FIG. 7, the optical properties of the trial product exceed the above desired properties. Accordingly, it can be confirmed that the range of from 1.4 to 2.8 degrees is the most suitable value for the filter angle $\theta$. As shown clearly in FIG. 7, the filter type distinguishing device 11 can be carried out with the communication light $\lambda_o$ at a wavelength of 1.31 $\mu$m, and the test light $\lambda_t$ at a wavelength of 1.55 $\mu$m. Then, the transmission losses are 1.5 dB or less, that is, one part out of six compared with the conventional devices.

Furthermore, when the filter angle $\theta$ is set to the most suitable value, the volume Lrt of the reflection attenuation of the test light in the filter type distinguishing device 11 becomes usually smaller than that of Fresnel reflection in the optical fiber broken by bending and the like.

In the above data base 13, there are stored the data on the intensity (level) of reflected test pulse light and reflecting position, which were beforehand detected by the light pulse testing apparatus 6 at the normal state of the optical path (optical fiber cable 2).

Figure 8A:
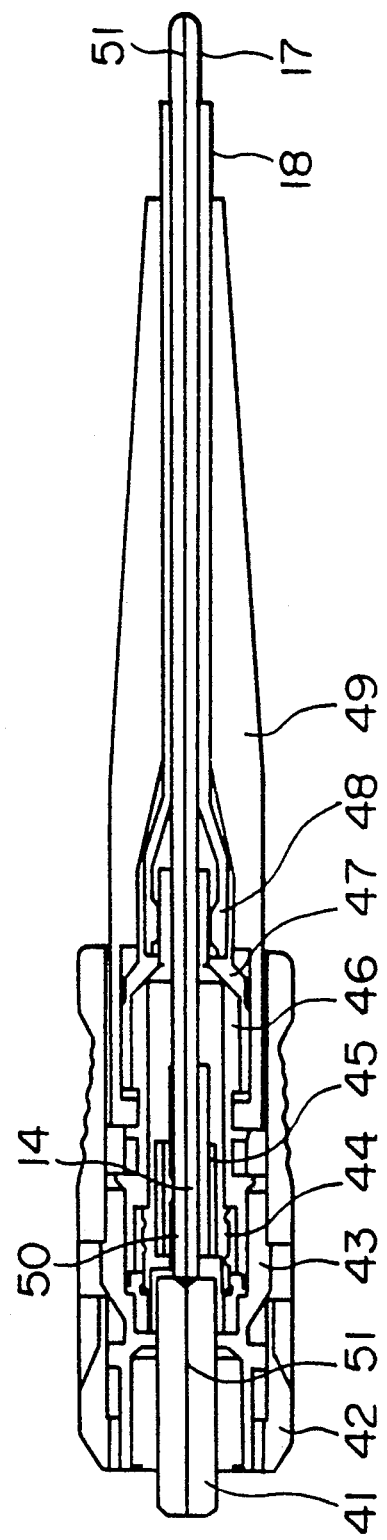
FIG. 8(a) is a sectional side view illustrating the construction of an connector packaging type optical filter type fault distinguishing device according to the preferred embodiment of the present invention.
Figure 8B:
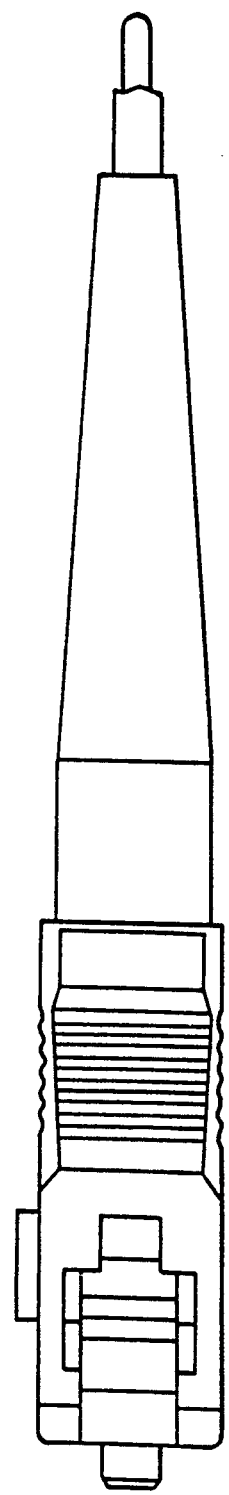
FIG. 8(b) is a sectional view of the same device as shown in FIG. 8(a).

FIG. 8(a) is a sectional side view illustrating the construction of a connector packaging type filter type distinguishing device (hereinafter referred to as filter embedded connector). FIG. 8(b) is a sectional view of the same filter embedded connector. In these figures, a reference numeral 41 denotes a connecting ferrule made from a material such as zirconia. 42 denotes a knob. 43 denotes a plug frame. 44 denotes a spring. 45 denotes a sleeve. 46 denotes a stop ring. 47 denotes a caulking ring. 48 denotes a ring. 49 denotes a holder made from a rubber. 50 denotes a reinforcement and 51 denotes an exposed optical fiber. Herein, the optical filter 14 comprises layers having thicknesses less than tens of microns in thickness. As described above, according to the filter embedded connector, miniaturization as well as reduction of manufacturing costs can easily be achieved.

In addition, a high reliability as well as reduction of optical losses can be achieved.

(2) Operation

Figure 9:
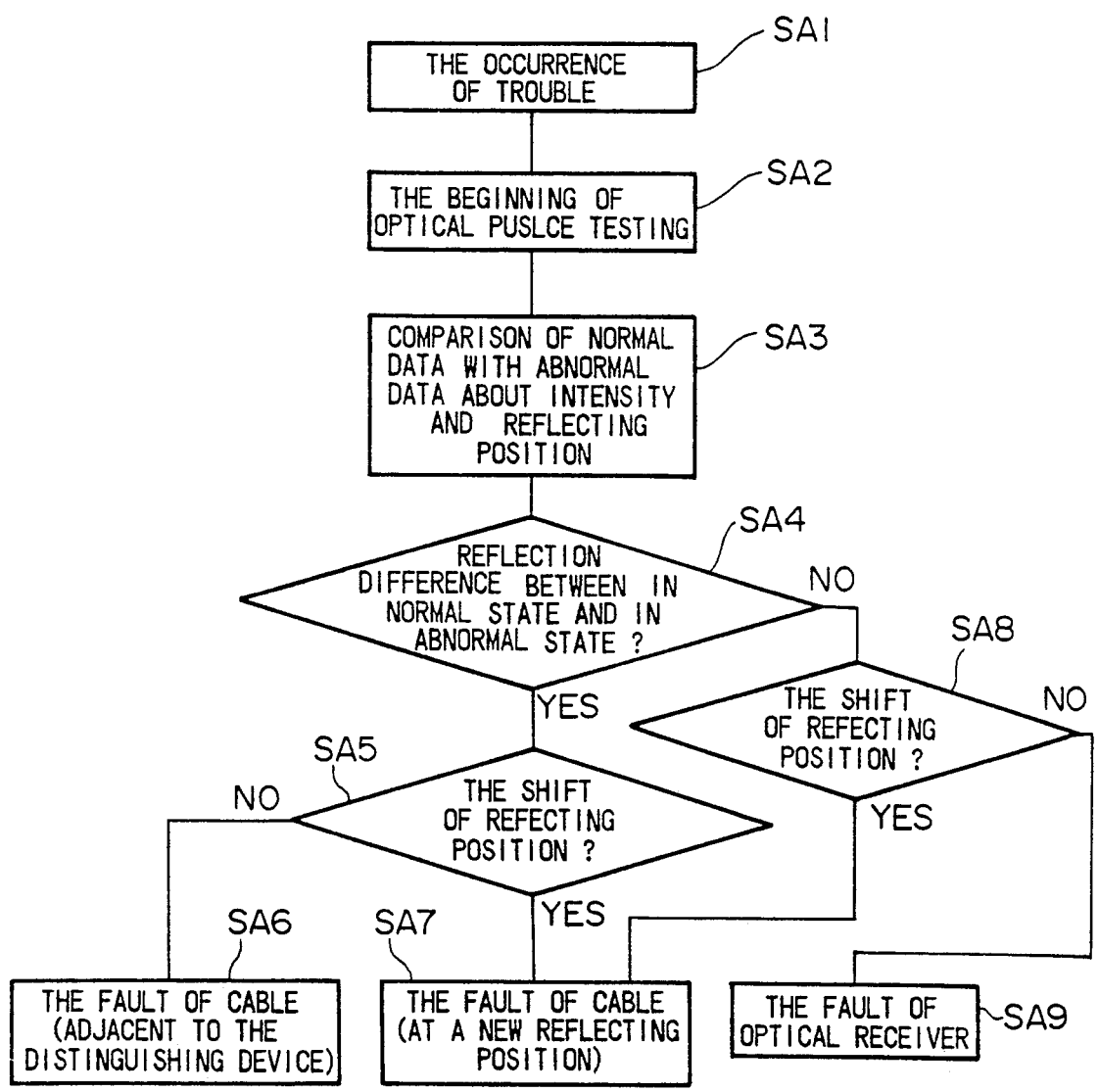
FIG. 9 is a flow chart showing an operation of a device and a method according to a first preferred embodiment of the present.

Next, description will be given with respect to the operation of the device and the method according to the first preferred embodiment as described above, with reference to the flow chart shown in FIG. 9.

When trouble occurs in an optical transmission system, an alarm signal is generated from the optical transmitter 1 or the optical receiver 3. After a checker receives the alarm signal and is notified of the trouble, he sets the light pulse testing apparatus 6 working (step SAl).

Then, CPU 12 proceeds to step SA2. In step SA2, CPU 12 introduces the test pulse light $\lambda_t$ emitted from the light pulse testing apparatus 6 into the transmission path (the optical fiber 2) and detects the intensity of the test pulse light reflected back by the filter type distinguishing device 11 and the reflecting position (that is, the fault position). Next, in step SA3, CPU 12 read out the measured values (the intensity of the reflected test pulse light, the reflecting position) in the above mentioned normal state from the data base 13. And CPU 12 compares the values read from the data base 13 (hereinafter referred to as normal data) with the values detected in step SA2 (hereinafter referred to as abnormal data). In step SA4, first, CPU 12 judges whether or not there is a difference between the normal state and abnormal state in terms of the intensity of the reflected test pulse light. When [YES] is determined as the result of judgment, that is, if the difference is detected, it can be found that a fault occurs in the transmission path (the optical fiber cable 2). Next, CPU 12 goes to step SA5 in order to detect the position where the fault occurs (the fault position) and judges whether or not the reflecting position has shifted. When the result of judgment is [NO], that is, when the reflecting position is not shifted, CPU 12 moves to step SA6. In step SA6, CPU 12 distinguishes that the cause of the fault exists in the transmission path and recognizes that the fault position is adjacent to the filter type distinguishing device 11. And CPU 12 outputs the results of distinguishing and recognition.

On the other hand, in step SA5, when the result of judgment is [YES], that is, when the reflecting position has shifted, CPU 12 proceeds to step SA7. In step SA7, CPU 12 distinguishes that the cause of the fault exists in the transmission path and recognizes that the fault position is a new reflecting position. And CPU 12 outputs the results of distinguishing and recognition.

On the other hand, in step SA4, when the result of judgment is [NO], that is, if there is not detected a difference between the normal state and abnormal state in terms of the intensity of the reflected test pulse light, CPU 12 goes to step SA8. In step SA8, CPU 12 judges whether or not the reflecting position has shifted. When [YES] is determined as the result of judgment, that is, when the reflecting position has shifted, CPU 12 proceeds to step SA7. In step SA7, CPU 12 distinguishes that the cause of the fault exists in the transmission path and recognizes that the fault position is a new reflecting position, and CPU 12 outputs the results of distinguishing and recognition.

On the other hand, in step SA8, when the result of judgment is [NO], that is, when the reflecting position is not sifted, CPU 12 goes to step SA9. In step SA9, CPU 12 distinguishes that the cause of the fault exists in the optical receiver 3, and CPU 12 outputs the results of distinguishing.

(3) Effects

According to the first preferred embodiment, because an insertion losses in the filter type distinguishing device 11 is extremely decreased, the device can distinguish the fault between the optical fiber cable and the optical receiver with with 100% accuracy, owing to the fault in the optical transmission system accompanying the intensity change of the reflected test pulse light.

Furthermore, the fault position (the reflecting position) can be recognized exactly.

[B] Second Embodiment

In the following section, the second preferred embodiment of the present invention will be described with reference to FIG. 10.

Figure 10:
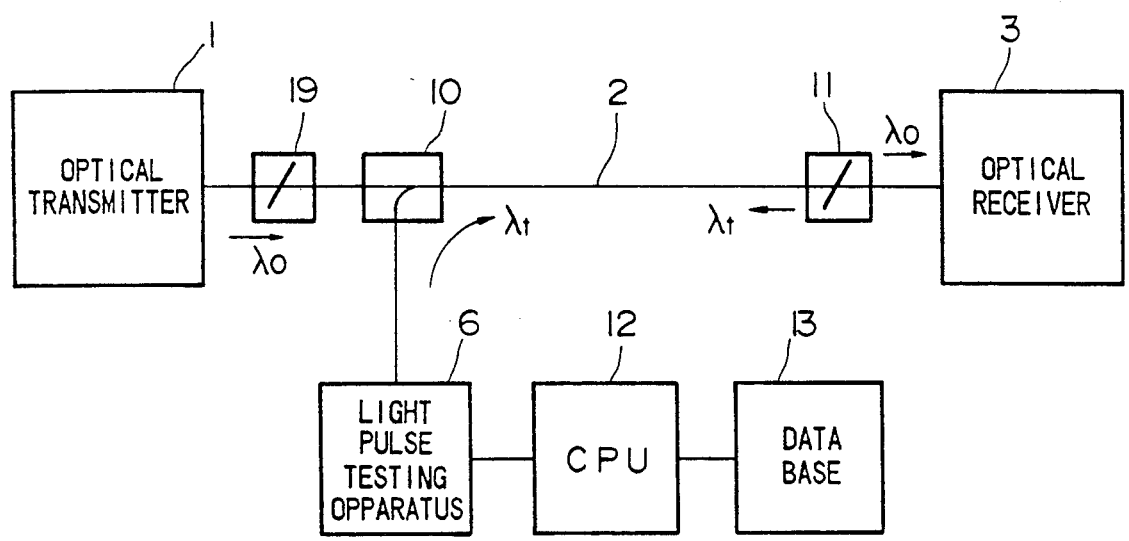
FIG. 10 is a block diagram showing an optical transmission system employing a fault distinguishing device and a method according to a second preferred embodiment of the present invention.

FIG. 10 is a block diagram showing an optical transmission system employing a fault distinguishing device and a method according to the second preferred embodiment of the present invention.

The second embodiment differs from the first embodiment shown in FIG. 3 in that an optical filter 19 employed in the second embodiment is inserted between the optical transmitter 1 and the optical coupler 10. The optical filter 19 has the construction identical to the filter shown in FIG. 4, but differs from the latter in the point that the filter angle $\theta$ is set corresponding to the volume of the reflection attenuation of no less than 37 dB, that is, on the order of about 9 degrees.

In addition to effects of the first preferred embodiment, a fault distinguishing system according to the second preferred embodiment, has the advantage of preventing light emitting devices and photo-sensitive devices in optical transmission system from breaking down at high intensity of the test pulse light $\lambda_t$, because bad influence of the reflected light on the optical transmitter is eliminated.

[C] THIRD EMBODIMENT

In the following section, the third preferred embodiment of the present invention will be described with reference to FIGS. 11 to 15.

Figure 11:
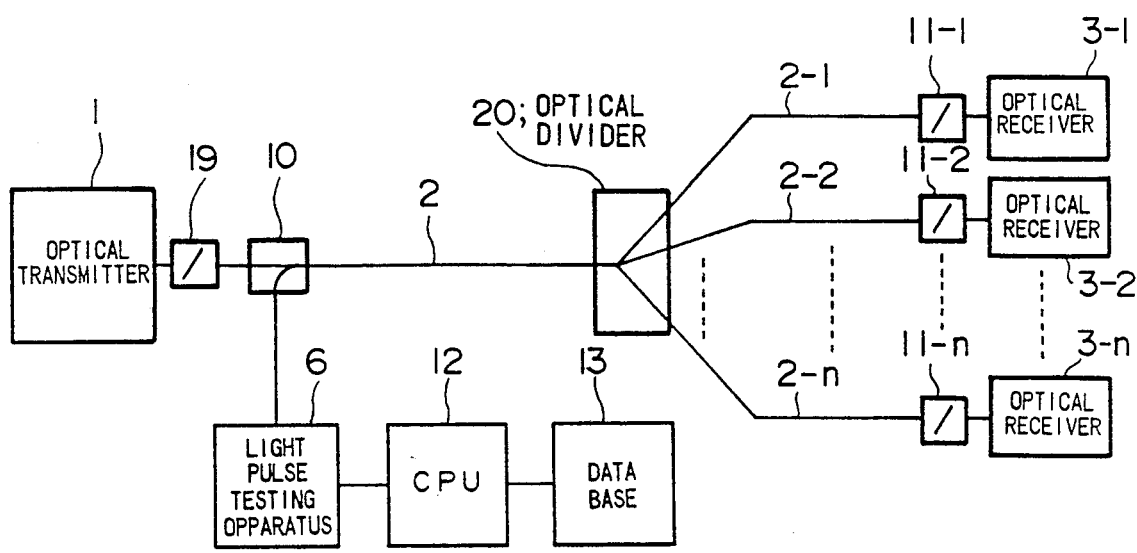
FIG. 11 is a block diagram showing an optical transmission system employing a fault distinguishing device and a method according to a third preferred embodiment of the present invention.

FIG. 11 is a block diagram showing an optical transmission system employing a fault distinguishing device and a method according to the third preferred embodiment of the present invention.

The main differences between the third embodiment and the second embodiment shown in FIG. 10 are that a one to n optical divider 20, such as a star type coupler, is inserted in the optical fiber cables and that n optical receivers 3-1,3-2,3-n in the subscriber lines are connected via branching optical fiber cables 2-1,2-2,2-n to the subscribers input ports of the one to n optical divider 20 and optical type filter type distinguishing devices 11-1,11-2,11-n are respectively inserted in the branching optical fiber cables 2-1,2-2,2-n in right fronts of the optical receivers. A distances between the optical receivers 3-1,3-2,3-n set in each subscriber's home and office and the optical divider 20 are generally different from each other.

Therefore, the respective different data on reflecting positions is gained, owing to respective different distances from the pulse testing apparatus 6 to optical filter type fault distinguishing device 11-1,11-2,11-n.

Figure 12:
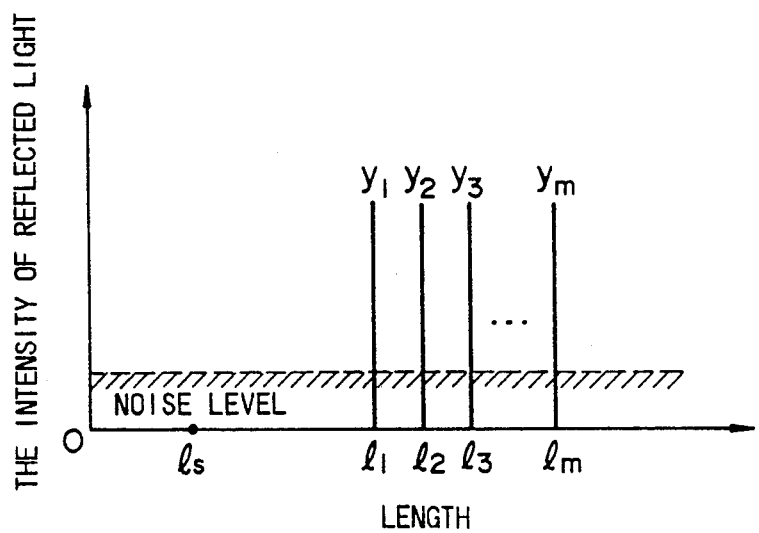
FIGS. 12 to 14 are graphs illustrating the fault distinguishing method according to the third preferred embodiment of the present invention.

FIG. 12 is a graph showing intensity (level) of reflected test pulse light and distance from pulse testing apparatus 6 to optical filter type fault distinguishing device (reflecting position), which were beforehand detected by the light pulse testing apparatus 6 at the normal states of the optical paths 2, 2-1,2-2,2-n. Suppose that it were found that two or more of the above mentioned distances are equal to each other, these distances might be adjusted to the length the cord of, for example, the filter embedded connector shown in FIG. 18(a).

In FIG. 12, $l_1$, $l_2$, and $l_n$ ($l_1$, $l_2$, $l_n$) in X-axis denote distances from pulse testing apparatus 6 to respective reflecting positions, corresponding to increasing order of length from the optical divider 20 to optical filter type fault distinguishing device 11-1, 11-2, and 11-n. Also in FIG. 12, $y_1$, $y_2$, and $y_m$ denote reflective intensities (level) of reflected test pulse light corresponding to the above distances $l_1$, $l_2$, and $l_m$. For example, it is found that reflective intensity $y_1$ is that of the reflected test pulse light from the optical filter type fault distinguishing device, which is set for the subscriber closet to the optical divider 20. Also, it is found that reflective intensity $y_m$ is that of the reflected test pulse light from the optical filter type fault distinguishing device, which is set for the subscriber the mth closet to the optical divider 20.

Figure 13:
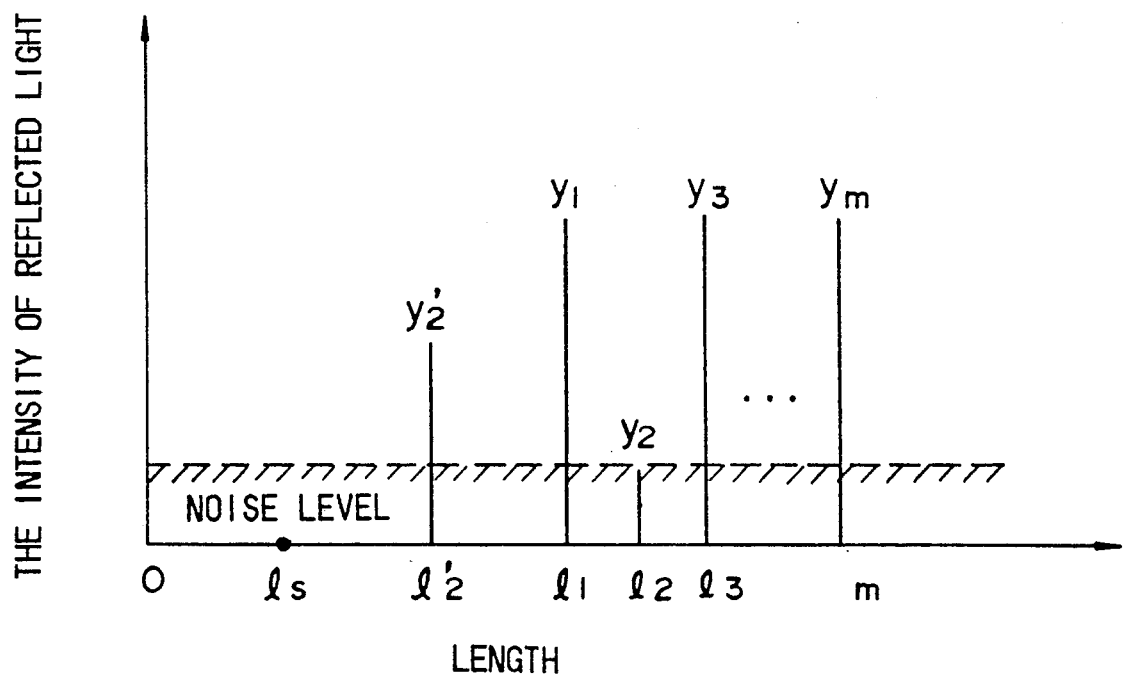
Figure 14:
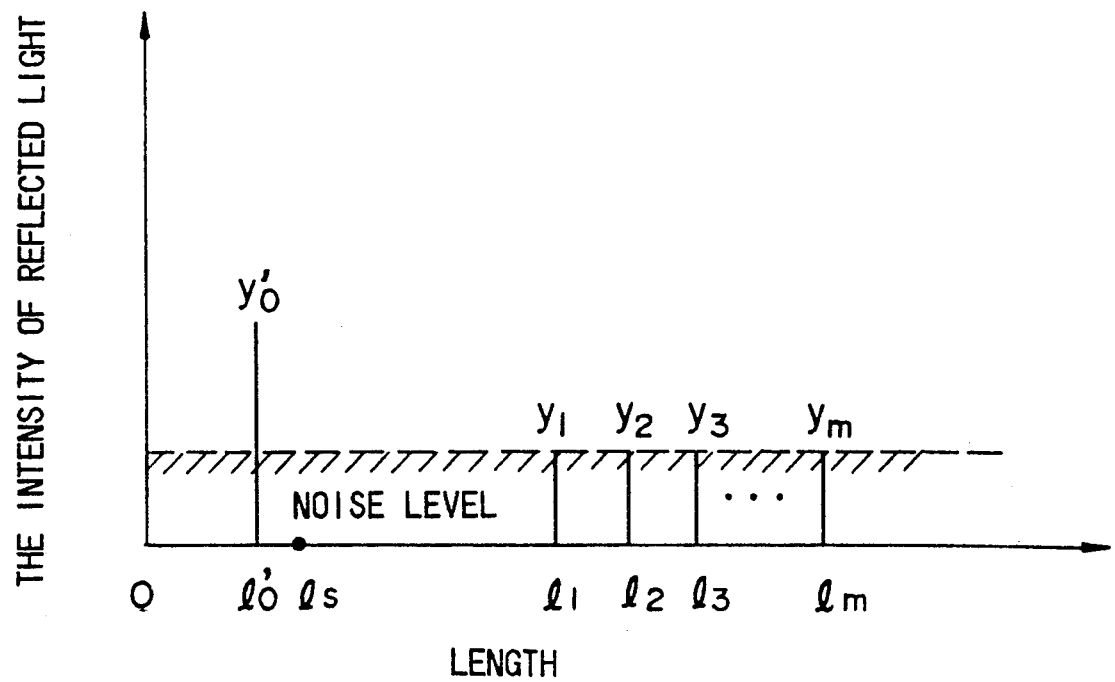

FIG. 13 is a graph showing the measured result of reflection attenuation by pulse testing apparatus 6 for the test pulse light reflected from the broken position on branching optical fiber cable 2-2, which connects the second subscriber and the optical divider 20. As shown in this FIGURE, the measured value of the reflected intensity $y_2$ is below a noise level and a new Fresnel reflection $y_2'$ at a distance $l_2'$ is detected. Accordingly, it is found by the same FIGURE that the fault position is the point of distance $l_2'$ in branching optical fiber cable 2-2. On the other hand, FIG. 14 is a graph showing the measured result of reflection attenuation by testing apparatus 6 for the test pulse light reflected from the broken position of optical fiber cable 2 between the optical coupler 10 and the optical divider 20. In the latter case, the measured value of the intensity of test pulse light, which is reflected from each optical filter type fault distinguishing devices 11-1,11-2, and 11-n, is below a noise level, and there is detected a new Fresnel reflection $y_0'$ at the break point between the optical divider 20 and pulse testing apparatus 6 (0-$l_0$). Accordingly, it is found that the fault position is the point of distance $l_2'$ in optical fiber cable 2 before optical divider 20.

Figure 15:
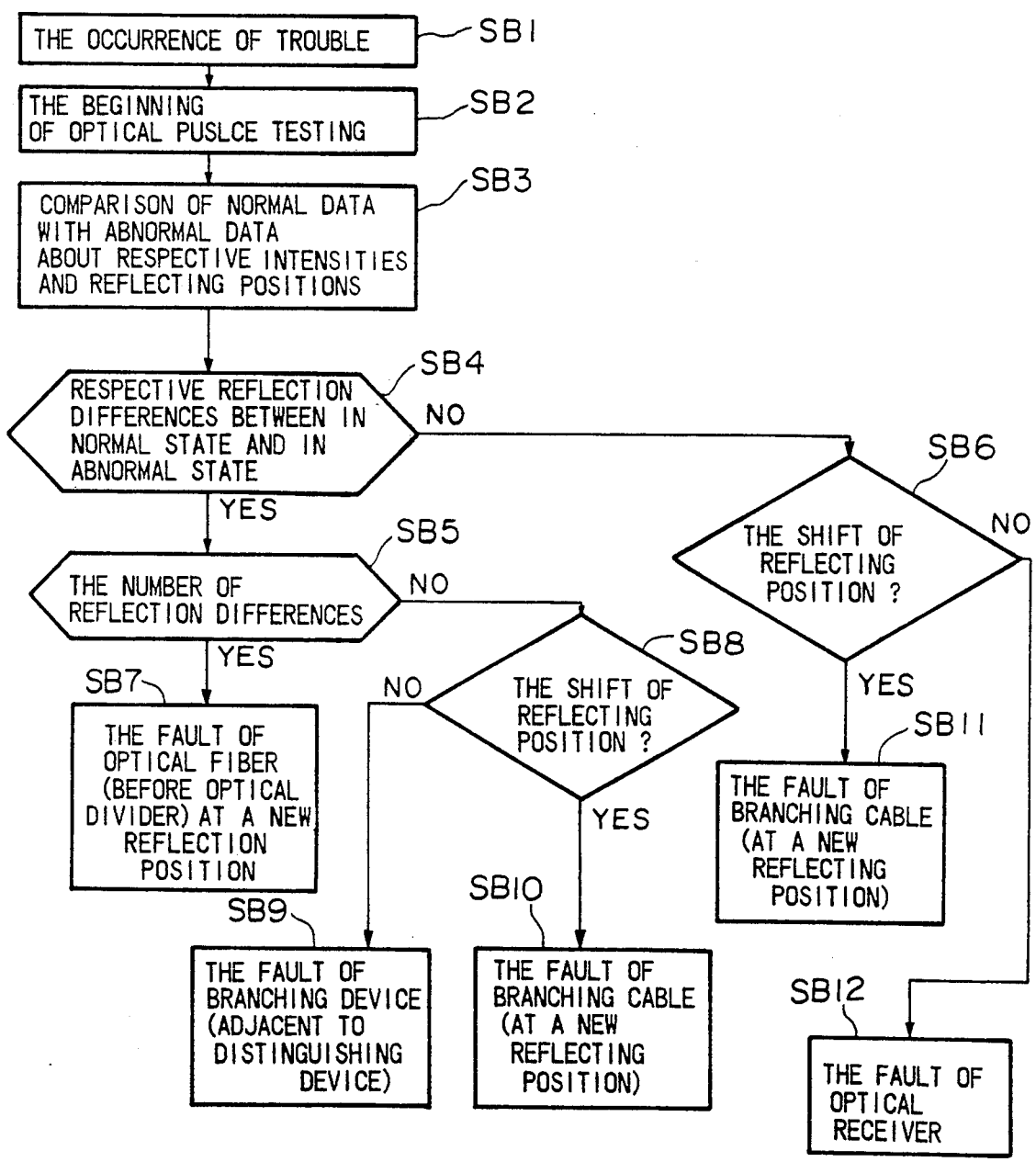
FIG. 15 is a flow chart showing an operation of a device and a method according to the third preferred embodiment of the present invention.

Next, description will be given with respect to the operation of the method according to the third preferred embodiment as described above, with reference to the flow chart shown in FIG. 15.

When the trouble occurs in an optical transmission system, an alarm signal is generated from the optical transmitter 1 or one of the optical receiver 3-1,3-2, and 3-n. A checker receives the alarm signal and is notified of the trouble. he sets the light pulse testing apparatus 6 working (step SB1). Then, CPU 12 proceeds to step SB2. In step SB2, CPU 12 introduces the test pulse light $\lambda_t$ emitted from the light pulse testing apparatus 6 into the transmission path (the optical fiber 2) and detects the intensity of the test pulse light reflected back by each filter type distinguishing device 11-1,11-2, and 11-n, and the reflecting position. Next, in step SB3, CPU 12 reads out respectively the measured values (each intensity of the reflected test pulse light, each reflecting position) in the above mentioned normal state from the data base 13.

And in step SB2, CPU 12 compares the values (normal data) read from the data base 13 with the values (abnormal data) detected, concerning the respective filter type distinguishing device 11-1,11-2, and 11-n. In step SB4, first, CPU 12 judges whether or not there occurs at least one difference between the normal state and abnormal state in terms of the intensity of the reflected test pulse light. When [YES] is determined as the result of judgement, that is, if at least one difference is detected, CPU 12 goes to step SB5. In step SB5, CPU 12 judges whether or not that the number of the differences equals to the number n of branching optical fiber cables 2-1,2-2,2-n, that is, the number of subscribers. When the result of judgement is [YES], that is, when the number of the differences equals to the number n of branching optical fiber cables 2-1,2-2,2-n, CPU 12 moves to step SB7. In step SB7, CPU 12 distinguishes that the cause of the fault exists in the optical fiber cable 2 before optical divider (star coupler) 20 and recognizes that the fault position is a new reflecting position. And CPU 12 outputs the results of distinguishing and recognition.

On the other hand, in step SB5, when the result of judgement is [NO], that is, when the number of the differences does not equal to the number n of branching optical fiber cables 2-1,2-2,2-n, CPU 12 goes to step SB8. In step SB8, CPU 12 judges whether or not there occurs a difference between the normal state and abnormal state in terms of the reflecting position of the reflected test pulse light. When the result of judgment is [NO], that is, when the reflecting position is not shifted, CPU 12 moves to step SB9. In step SB9, CPU 12 distinguishes that the cause of the fault exists in one branching optical fiber cable for subscriber behind optical divider 20 and recognizes that the fault position is at variation point of reflection intensity, that is, adjacent to the filter type distinguishing device connected to the above one branching optical fiber cable.

And CPU 12 outputs the results of distinguishing and recognition. Here, description has already been given with respect to a method detecting the broken one out of the plural branching opticla fiber cables 2-1, 2-2, and 2-n, with reference to FIG. 13.

On the other hand, in step SB8, when the result of judgment is [YES], that is, that is, when the reflecting position has shifted, CPU 12 moves to step SB10. In step SB10, CPU 12 distinguishes that the cause of the fault exists in one branching optical fiber cable for subscriber behind optical divider 20 and recognizes that the fault position is a new reflecting position. And CPU 12 outputs the results of distinguishing and recognition.

On the other hand, in step SB4, when [NO] is determined as the result of judgment, that is, if no difference is detected, CPU 12 goes to step SB6. In step SB6, CPU 12 judges whether or not there occurs a difference between the normal state and abnormal state in terms of the reflecting position of the reflected test pulse light. When the result of judgment is [YES], that is, when CPU 12 detects shift in the reflecting position, CPU 12 moves to step SB11. In step SB11, CPU 12 distinguishes that the cause of the fault exists in one branching optical fiber cable for a subscriber behind optical divider 20 and recognizes that the fault position is a new reflecting position. And CPU 12 outputs the results of distinguishing and recognition.

On the other hand, in step SB6, when the result of judgment is [NO], that is, when CPU 12 does not detect shift in the reflecting position, CPU 12 moves to step SB12. In step SB12, CPU 12 distinguishes that the cause of the fault exists in the corresponding optical receiver and CPU 12 outputs the result of distinguishing.

According to the third preferred embodiment, distinguishing clearly and separately a fault position in branching optical paths can be easily achieved.

In the present invention, the optical transmitter 1 and optical receiver 3 shown in FIGS. 3, 10 and 11, may replace each other.

Also, although in the above embodiments, the description about the number of optical fibers in cable 2 is omitted, because in actuality cable 2 is constituted by a bundle of optical fibers, selecting one of plural optical fibers is needed.

For this reason, an optical matrix switch is inserted between the optical coupler 10 and the light pulse testing apparatus 6.

Thus, according to the above embodiments, distinguishing a fault in regular order about respective optical fibers can be clearly, and automatically carried out by a remote control.

Furthermore, although in the above described preferred first embodiment, the filter angle $\theta$ of the optical filter 14 is set within the range of from 1.4 to 2.8 degrees which is the most suitable value for the filter angle $\theta$, the filter angle $\theta$ according to the present invention is not limited to the range of from 1.4 to 2.8 degrees.

Figure 16:
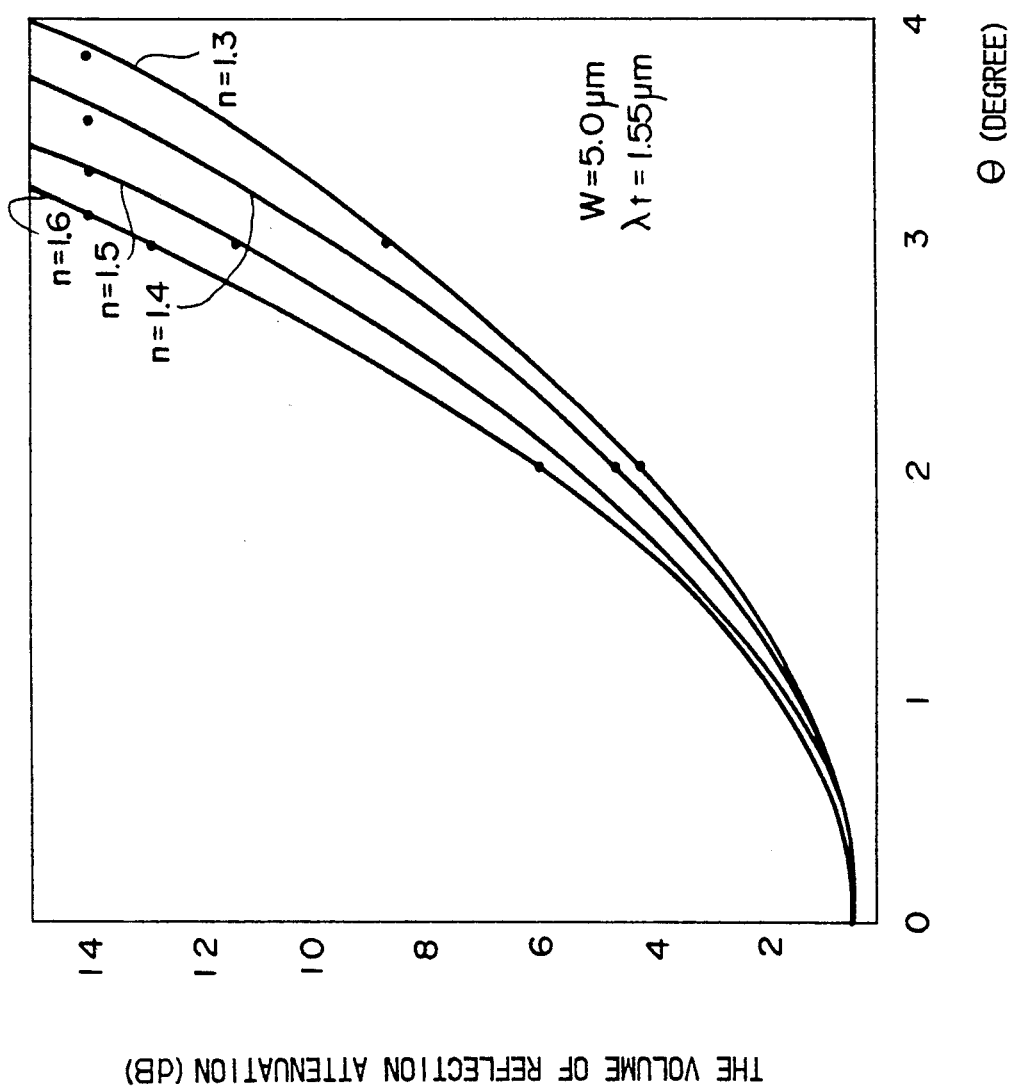
Figure 17:
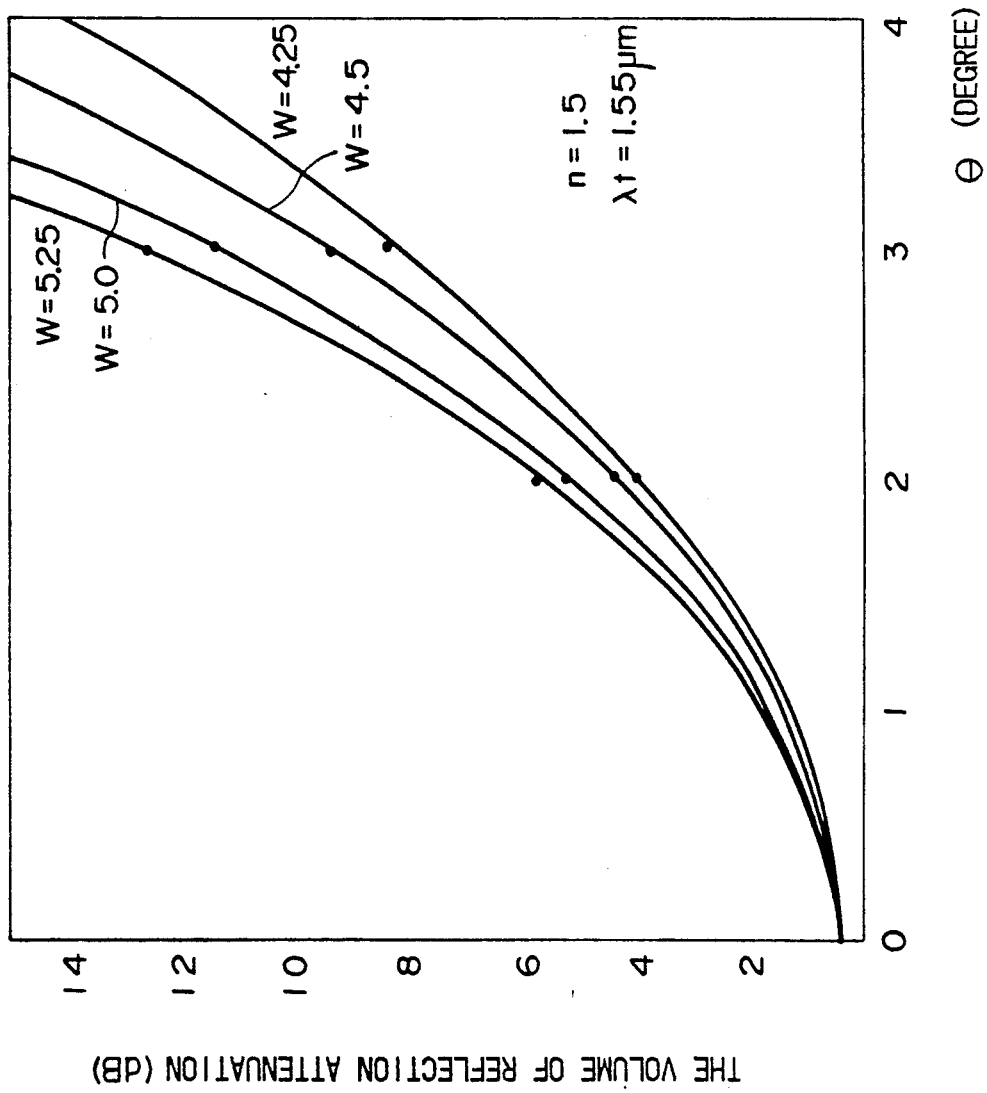

FIGS. 16 to 20 are graphs showing respectively volume of reflection attenuation based on the calculation result as a function of the filter angle $\theta$. Among these figures, FIG. 16 is a graph showing the relationship between the volume of reflection attenuation and the filter angle $\theta$, wherein the refractive index n of the cladding is varied within the range of from 1.3 to 1.6, with the spot size W of the optical fiber cable fixed at 5.0 μm and the wavelength $\lambda$ of the light fixed to 1.55 μm. FIG. 17 is a graph showing the relationship between the volume of reflection attenuation and the filter angle $\theta$, wherein the spot size W is varied within the range of from 4.5 to 5.25 μm, with the refractive index n fixed at 1.5 and the wavelength $\lambda$ fixed at 1.55 μm.

Figure 18:
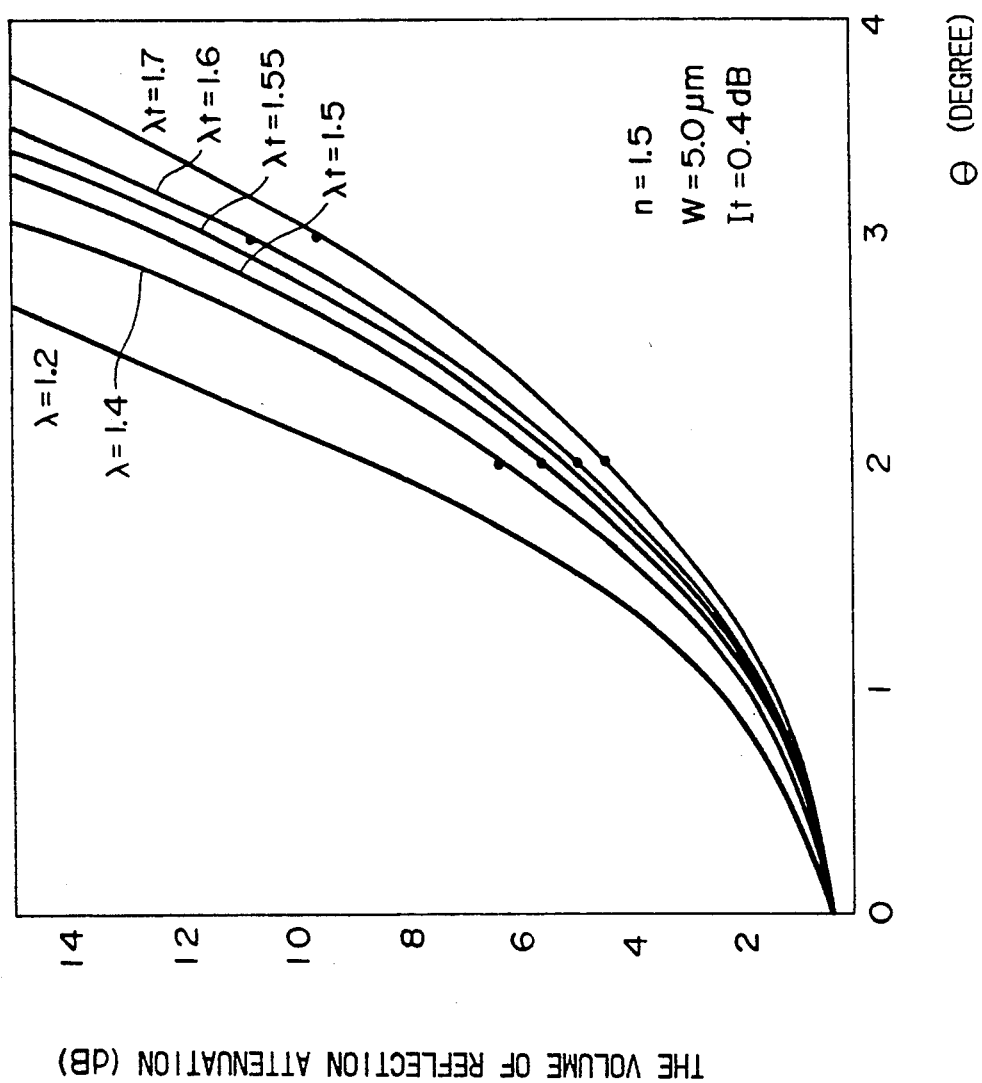

FIG. 18 is a graph showing the relationship between the volume of reflection attenuation and the filter angle $\theta$, wherein the wavelength $\lambda$ is varied within the range of from 1.2 to 1.7 μm, with the refractive index n fixed at 1.5 and the spot size W fixed at 5.0 μm.

Figure 19:
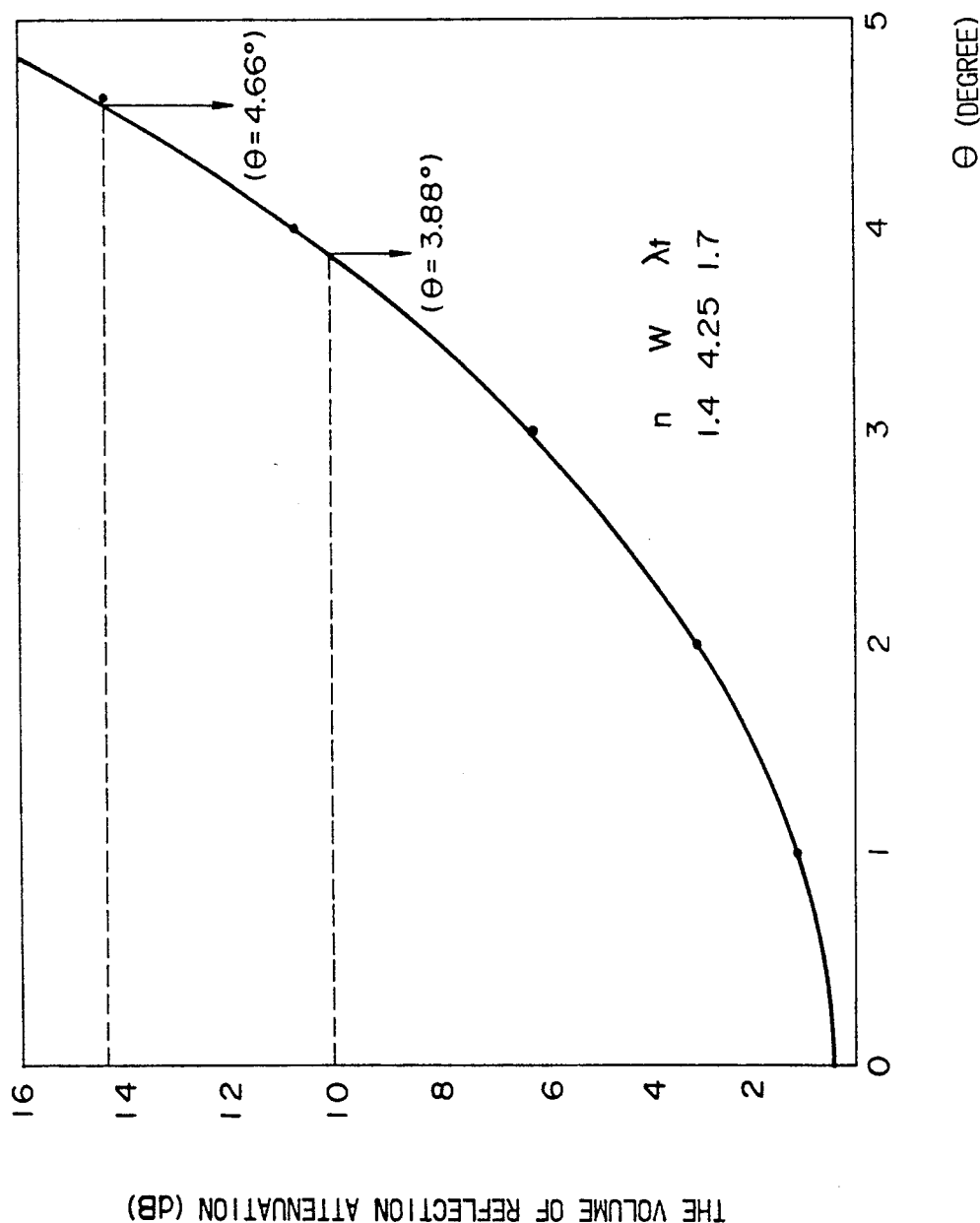
Figure 3:
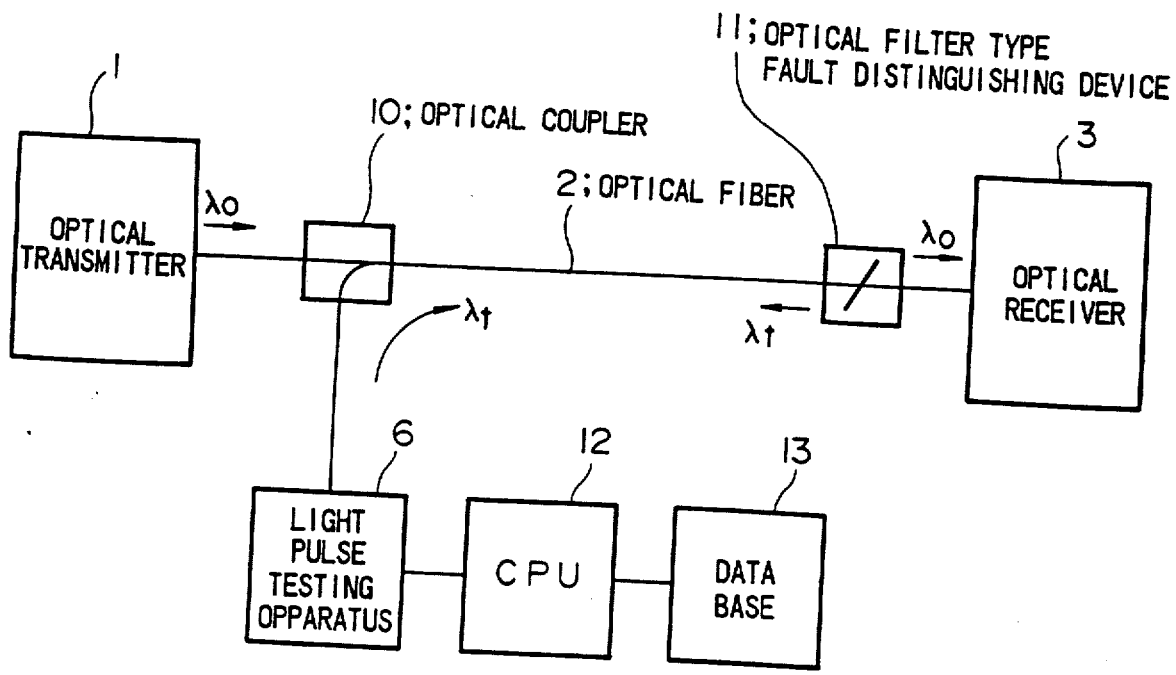
Figure 4:
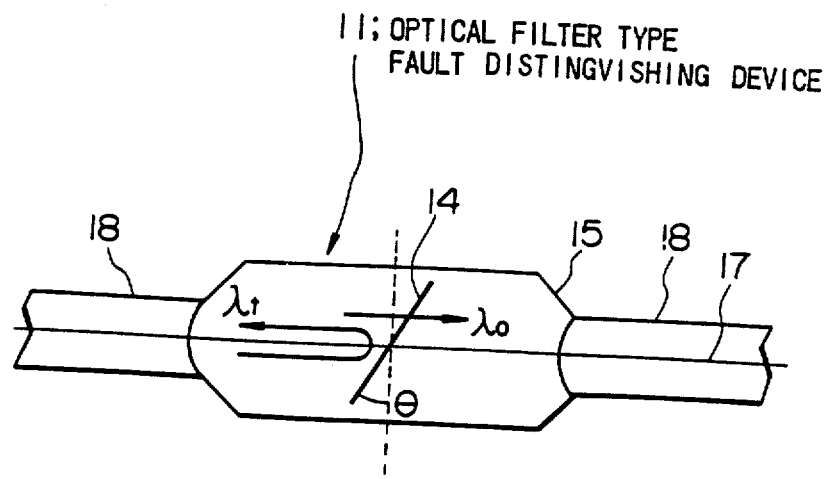

As shown in FIGS. 16 to 18, in the refractive index n within the range of from 1.4 to 1.6, the spot size W within the range of from 4.25 to 5.25 μm and the wavelength $\lambda$ within the range of from 1.2 to 1.7 μm, the maximum suitable value for the filter angle $\theta$ is 3.88 degrees at the refractive index n=1.4, the spot size W=4.25 μm and the wavelength $\lambda$=1.7 μm. FIG. 19 is a graph showing the relationship between the volume of reflection attenuation and the filter angle $\theta$ at the refractive index n=1.4, the spot size W=4.25 μm and the wavelength $\lambda$=1.7 μm. Accordingly, the light in the wavelength $\lambda$=1.7 μm is used as the test light $\lambda_t$.

Also, similarly the minimum suitable value for the filter angle $\theta$ is 1.14 degrees at the refractive index n=1.6, the spot size W=5.25 μm and the wavelength $\lambda$=1.2 μm. FIG. 20 is a graph showing the relationship between the volume of reflection attenuation and the filter angle $\theta$ at the refractive index n=1.6, the spot size W=5.25 μm and the wavelength $\lambda$=1.2 μm. Accordingly, the light in the wavelength $\lambda$=1.2 μm is used as the communication light $\lambda_\omega$.

Accordingly, if the combination of the spot size and wavelength is suitable, the most suitable value of the filter angle $\theta$ is extended to within the range of from 1.14 to 3.9 degrees.

Although in the above description, the most suitable value of the filter angle $\theta$ is determined in view of the system margin, in case the margin of the loss variation in the system may not be considered, the maximum suitable value for the filter angle $\theta$ is further enlarged to 4.7 degrees, at which the light pulse receiver 9 can detect the reflected light in the volume 14.3 dB of reflection attenuation for the broken optical fiber. Also, in case that ripple does not occur in the optical filter, the minimum suitable value for the filter angle $\theta$ is 0 degree.

Accordingly, in case that the margin of the loss variation in the system may not be considered, the most suitable value of the filter angle $\theta$ is further extended to within the range of from 0 to 4.66 degrees.

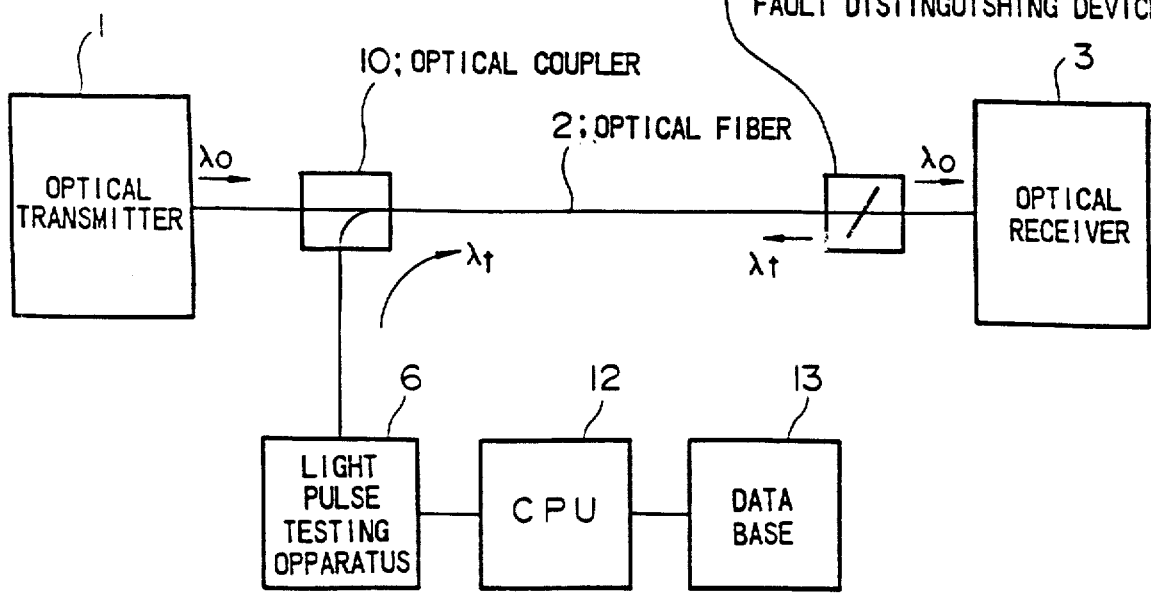

What is claimed is:

1. A fault distinguishing device for establishing whether fault exists in an optical fiber cable and in another optical system, where said fault distinguishing device is intermediate between said optical fiber cable and said another optical system and optically coupled with said optical fiber cable and said another optical system, such that said fault distinguishing device is characterized by including:
   at least one intrinsic optical fiber; and
   at least one optical filter, where said optical filter is internal to a corresponding intrinsic optical fiber, and forms an angle of between 0 and 4.7 degrees inclusive with respect to a plane perpendicular to the longitudinal axis of said intrinsic optical fiber, such that said optical filter is capable of reflecting a first light component and of transmitting a second light component, where said first light component and said second light component differ from one another in terms of wavelength.

2. A fault distinguishing device in accordance with claim 1 above wherein which said another optical system comprises at least one optical receiver.

3. A fault distinguishing device in accordance with either of claims 1 or 2 above wherein said first and second light components are in a wavelength range from of 1.2 to 1.7 μm.

4. A fault distinguishing device in accordance with either of claims 1 or 2 above wherein a refractive index of a cladding of said intrinsic optical fiber is from 1.4 to 1.6.

5. A fault distinguishing device in accordance with either of claims 1 or 2 above wherein a spot size of said optical fiber is from 4.25 to 5.25 μm.

6. A fault distinguishing device in accordance with either of claims 1 or 2 above wherein a spot size of said optical fiber is from 4.25 to 5.25 μ, wherein a refractive index of a cladding of said optical fiber is from 1.4 to 1.6, and wherein said first and second light components are in a wave band of 1.2 to 1.7 μm in wavelength.

7. A fault distinguishing device in accordance with either of claims 1 or 2 above, wherein said wavelength of said first light component is longer than said wavelength of said second light component.

8. A fault distinguishing device in accordance with claim 7 above, wherein said wavelength of said first light component is from 1.50 to 1.60 μm and said wavelength of said second light component is from 1.25 to 1.35 μm.

9. A fault distinguishing device in accordance with claim 8 above wherein said optical filter is inserted in said optical fiber, set to a region of 1.4 to 2.8 degrees against a plane perpendicular to an axis of said optical fiber.

10. A method for distinguishing a fault for establishing whether fault exists in an optical fiber cable and in another optical system, said method comprising the steps of:
    introducing a test pulse light for detecting a fault position into said optical fiber cable via an optical coupler, whereby said test pulse light is used for detecting a fault position and different from a communication light for transmitting data;
    receiving said test pulse light reflected by an optical filter disposed in front of said another optical system, and whereby detecting an intensity of said reflected test pulse light and a reflecting position, wherein said optical filter reflects only said test pulse light;
    comparing said detected intensity and reflecting position with a beforehand measured intensity and reflecting position about said test pulse light reflected by said optical filter at normal state in said optical transmission system;
    judging that a fault exists in said optical fiber cable and determining a position of said fault, as a result of said comparison, when variation occurs in at least one of said intensity and reflecting position; and judging that a fault does not exist in said optical fiber cable, as a result of said comparison, when variation does not occur in both said intensity and reflecting position.

11. A method for distinguishing a fault in accordance with claim 10 above, where said another optical system comprises an optical receiver.

12. A method for distinguishing a fault among an optical fiber cable, branching optical fibers and optical receivers employed in an optical transmission system, said method comprising the steps of:

introducing respectively test pulse lights for detecting a fault position into said branching optical fiber cables via an optical divider, whereby said test pulse lights are used for detecting fault positions and different from a communication light for transmitting data;

receiving said test pulse lights reflected by respective optical filters disposed immediately in front of said optical receivers, and whereby detecting intensities of said reflected test pulse lights and reflecting positions, wherein said optical filters reflect only said test pulse lights;

comparing said detected intensities and reflecting positions with beforehand measured intensities and reflecting positions about said test pulse lights reflected respectively by said optical filters at normal state in said optical transmission system;

judging that a fault exists in said optical fiber cable and determining a position of said fault, as a result of said comparison, when variation occurs in at least one of said intensities and reflecting positions; and judging that a fault does not exist in said optical fiber cable, as a result of said comparison, when variation does not occurs in neither of said intensities and reflecting positions.

* * * * *

UNITED STATES PATENT AND TRADEMARK OFFICE
CERTIFICATE OF CORRECTION

PATENT NO. : 5,177,354

DATED : January 5, 1993

INVENTOR(S) : Nobuo Tomita et al

It is certified that error appears in the above-indentified patent and that said Letters Patent is hereby corrected as shown below:

The Title page should be deleted to appear as per attached Title Page.

The Sheet of Drawing consisting of Figure 3 should be deleted and the attached Sheet of Figure 3 added.

Column 14, line 19, change "occurs" to --occur--.

Signed and Sealed this

Twenty-second Day of March, 1994

Attest:

BRUCE LEHMAN

*Attesting Officer*     *Commissioner of Patents and Trademarks*

United States Patent [19]

Tomita et al.

[11] Patent Number: 5,177,354

[45] Date of Patent: Jan. 5, 1993

[54] DEVICE AND A METHOD FOR DISTINGUISHING FAULTS EMPLOYED IN AN OPTICAL TRANSMISSION SYSTEM

[75] Inventors: Nobuo Tomita, Ibaraki; Takashi Nakamura, Shiga; Hidetoshi Takasugi, Saitama; Hideki Suzuki, Kanagawa, all of Japan

[73] Assignee: Nippon Telegraph and Telephone Corporation, Tokyo, Japan

[21] Appl. No.: 624,444

[22] Filed: Dec. 10, 1990

[30] Foreign Application Priority Data

Dec. 11, 1989 [JP] Japan ................. 1-320946
Sep. 3, 1990 [JP] Japan ................. 2-232734

[51] Int. Cl.⁵ ............................................. H01J 5/16
[52] U.S. Cl. .......................... 250/227.15; 250/227.23; 356/73.1
[58] Field of Search .............. 356/73.1; 250/227.15, 250/227.18, 227.21, 227.23, 227.24, 227.25; 385/47, 48

[56] References Cited

U.S. PATENT DOCUMENTS

| | | | |
|---|---|---|---|
| 3,981,592 | 9/1976 | Williams | 250/227.15 |
| 4,373,775 | 2/1983 | Gasparian | 385/47 |
| 4,637,682 | 1/1987 | Mahlein et al. | 385/47 |
| 4,749,247 | 6/1988 | Large | 356/73.1 |
| 4,774,407 | 9/1988 | Erbe | 250/227.23 |
| 4,813,756 | 3/1989 | Frenkel et al. | 350/96.18 |
| 4,848,999 | 7/1989 | Taylor | 385/48 |
| 4,899,043 | 2/1990 | Mochizuki et al. | 356/73.1 |
| 4,899,045 | 2/1990 | Kramer | 250/227.23 |
| 5,001,338 | 3/1991 | Boero | 250/227.23 |

FOREIGN PATENT DOCUMENTS 0037057 10/1981 European Pat. Off.
59-196438 11/1984 Japan.

OTHER PUBLICATIONS

The Bell System Technical Journal, vol. 56, No. 5, May–Jun. 1977 "Loss Analysis of Single-Mode Fiber Splices", D. Marcuse, pp. 703–718.

Primary Examiner—David C. Nelms
Assistant Examiner—John R. Lee
Attorney, Agent, or Firm—Finnegan, Henderson, Farabow, Garrett and Dunner

[57] ABSTRACT

The present invention discloses a fault distinguishing device for establishing whether fault exists in an optical fiber cable and in another optical system. The disclosed device is intermediate between the optical fiber cable and the another optical system and optically coupled with the optical fiber cable and the another optical system. The disclosed device is composed of at least one intrinsic optical fiber and at least one optical filter. The optical filter is internal to a corresponding intrinsic optical fiber, and forms an angle of between 0 and 4.7 degrees inclusive with respect to a plane perpendicular to the longitudinal axis of the intrinsic optical fiber, such that the optical fiber is cable of reflecting a first light component and of transmitting a second light component. The first light component and the second light component differ from one another in terms of wavelength.

12 Claims, 15 Drawing Sheets